(12) United States Patent
Ahmed et al.

(10) Patent No.: US 7,688,924 B2
(45) Date of Patent: Mar. 30, 2010

(54) METHODS AND APPARATUS FOR ASYNCHRONOUS SERIAL CHANNEL CONNECTIONS IN COMMUNICATION SYSTEMS

(75) Inventors: Yasser Ahmed, Macungie, PA (US); Robert D. Brink, Coopersburg, PA (US); Gregory W. Sheets, Bangor, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 1327 days.

(21) Appl. No.: 11/089,216

(22) Filed: Mar. 24, 2005

(65) Prior Publication Data
US 2006/0215782 A1     Sep. 28, 2006

(51) Int. Cl.
- *H04L 7/00* (2006.01)
- *H04L 7/04* (2006.01)
- *H04L 12/50* (2006.01)
- *H04J 3/06* (2006.01)
- *H03K 9/00* (2006.01)

(52) U.S. Cl. .......... 375/354; 375/362; 375/316; 370/358; 370/509

(58) Field of Classification Search .......... 375/370, 375/371, 372, 354, 362, 316; 370/358, 509
See application file for complete search history.

(56) References Cited

U.S. PATENT DOCUMENTS

| | | | |
|---|---|---|---|
| 4,610,010 A * | 9/1986 | Claessen et al. | 370/282 |
| 5,185,736 A * | 2/1993 | Tyrrell et al. | 370/358 |
| 5,649,122 A * | 7/1997 | Wegner et al. | 710/105 |
| 5,761,434 A * | 6/1998 | Hewitt | 709/231 |
| 5,796,796 A * | 8/1998 | Wang | 375/372 |
| 6,347,380 B1 * | 2/2002 | Chang et al. | 713/503 |
| 6,374,313 B1 * | 4/2002 | Popat | 710/52 |
| 6,545,617 B1 * | 4/2003 | Morikawa | 341/100 |
| 7,227,876 B1 * | 6/2007 | Cochran et al. | 370/509 |
| 7,305,058 B1 * | 12/2007 | Venkata et al. | 375/372 |
| 2002/0184413 A1* | 12/2002 | Wingen | 710/52 |
| 2003/0185325 A1* | 10/2003 | Wahl | 375/362 |
| 2005/0188146 A1* | 8/2005 | Teo | 711/5 |

FOREIGN PATENT DOCUMENTS

EP        0665502 A1 *    2/1995

* cited by examiner

*Primary Examiner*—Mohammad H Ghayour
*Assistant Examiner*—Sarah Hassan
(74) *Attorney, Agent, or Firm*—Ryan, Mason & Lewis, LLP

(57) ABSTRACT

An integrated circuit device for use in a node of a communication system is provided. The integrated circuit device includes a memory configured to store data written thereto by a receiver associated with the node in accordance with a receiver clock, and to read data therefrom by a transmitter associated with the node in accordance with a transmitter clock. The integrated circuit device also includes a control logic circuit that is in communication with the memory, and is configured to send a control signal to the transmitter to adjust a speed of the transmitter clock responsive to an operating condition of the memory.

20 Claims, 2 Drawing Sheets

METHODS AND APPARATUS FOR ASYNCHRONOUS SERIAL CHANNEL CONNECTIONS IN COMMUNICATION SYSTEMS

FIELD OF THE INVENTION

The present invention relates generally to communication systems, and more particularly to asynchronous serial data channel connection techniques for use in communications systems.

BACKGROUND OF THE INVENTION

A number of different types of serial data channels are familiar to those skilled in the art. One example is Fibre Channel (FC). As is well known, Fibre Channel is an American National Standards Institute (ANSI) standard specifying a bidirectional serial data channel, structured for high performance capability. Physically, the Fibre Channel may be viewed as an interconnection of multiple communication points, interconnected by a link comprising a switching network, called a fabric, or a point-to-point link. Fibre is a general term used to cover all physical media types supported by the Fibre Channel, such as optical fibre, twisted pair, and coaxial cable.

Additional details regarding these and other aspects of Fibre Channel can be found in the ANSI Fibre Channel standard documents, including the FC-PH, FC-FS, FC-AL-2, FC-PI, FC-DA, FC-MI and FC-LS documents, all of which are incorporated by reference herein.

As mentioned above, Fibre Channels may interconnect multiple communication points. For example, nodes in a communication system may communicate over one or more serial links. Nodes are typically configured having respective transmitters and receivers.

A serial link between nodes may be considered synchronous or asynchronous. Synchronous serial links utilize a clocking technique in which a clock signal is transmitted along with the data. Asynchronous serial links lack this clock signal. Thus, clocks at, and the resulting frequencies of, communicating transmitters and receivers are also asynchronous. The receiver determines the clocking of the signal on its own and derives how the signal is organized without consulting the transmitting device. Therefore, a receiver of a node may be connected with a first serial link having a first frequency, and a transmitter of the same node may be connected with a second serial link having a second, slightly different frequency. Similarly, when data is passed through a far end serial link, the receiver of a node may be connected to a first serial link and looped to the transmitter of the node that is connected to the same serial link. This data may be asynchronous to a system clock.

Asynchronous serial links are typically more efficient than synchronous serial links when there is low loss and low error rates over the transmission medium because data is not retransmitted. Further, asynchronous serial links do not require connection set-up steps before the communication is able to begin, as synchronous serial links require. However, asynchronous serial links are typically less reliable than synchronous serial links, and require hardware that is able to determine a clock signal. Finally, without an explicit clock signal, a transmitter in a node using an asynchronous serial link risks gradually losing synchronization with a receiver of the node.

Current implementations generally attempt to address the asynchronous serial link problem of losing clock synchronization through the insertion of special data words to accommodate the difference in frequency between the two serial channels. Another attempt utilizes a recovered clock of the receiver to clock the transmit channel. However, the recovered clock must be jitter-filtered before being used as the transmit clock, and jitter-filtering is complex and results in higher circuitry costs due to its area and power requirements.

Accordingly, what is needed is an improved approach to asynchronous serial data channel connection techniques in a communication system.

SUMMARY OF THE INVENTION

The present invention provides techniques for adjusting a transmitter clock of a node to correspond to a receiver clock of the node in a communication system using asynchronous serial connections.

In accordance with one aspect of the invention, an integrated circuit device for use in a node of a communication system is provided. The integrated circuit device includes a memory configured to store data written thereto by a receiver associated with the node in accordance with a receiver clock, and to read data therefrom by a transmitter associated with the node in accordance with a transmitter clock. The integrated circuit device also includes a control logic circuit that is in communication with the memory, and configured to send a control signal to the transmitter to adjust a speed of the transmitter clock responsive to the comparative speed of the receiver clock, responsive to an operating condition of the memory.

In an illustrative embodiment, the memory is a first-in first-out (FIFO) buffer and the integrated circuit device also includes a sampling counter that is in communication with the control logic circuit and is configured to have the control logic circuit send a control signal to adjust the speed of the transmitter clock. The integrated circuit device may also include a control register that is in communication with the sampling counter and initializes a defined count in the sampling counter. The receiver of the node may be adapted to communicate over a first serial link of the communication system and the transmitter of the node may be adapted to communicate over a second serial link of the communication system. In another embodiment, the receiver and the transmitter may be adapted to communicate over the same serial link of the communication system.

In accordance with another aspect of the invention, a method, for use in a communication system having at least one node, for controlling a transmitter clock of a node is described. Data is written to a memory of the at least one node by a receiver of the at least one node in accordance with a receiver clock. Data is read from the memory by a transmitter of the at least one node in accordance with a transmitter clock. A control message is sent from a control logic circuit of the at least one node, which is in communication with the memory, to the transmitter in order to adjust a speed of the transmitter clock.

In another illustrative embodiment, data is monitored at the memory through the control logic circuit. A distance between a data write pointer and a data read pointer in the memory is determined. A control message is sent to increase the speed of the transmitter clock when the distance between the data write pointer and the data read pointer reaches a first threshold value. A control message is sent to decrease the speed of the transmitter clock when the distance between the data write pointer and the data read pointer reaches a second threshold value. A sampling counter in communication with the control logic circuit is initialized when a control message is sent.

Another control message is sent from the control logic circuit to the transmitter to adjust the speed of the transmitter clock when the sampling counter reaches a defined count and the distance between the data write pointer and the data read pointer remains approximately the same.

Advantageously, the present invention in the illustrative embodiments provides for a seamless connection between two asynchronous serial links, while also providing a method that allows a system to loop-back a serial link that is asynchronous to the system clock.

DETAILED DESCRIPTION OF THE INVENTION

The invention will be illustrated herein in conjunction with exemplary communication systems comprising one or more bidirectional point-to-point serial data channels configured in accordance with the ANSI Fibre Channel standard. It should be understood, however, that the invention is more generally applicable to any system comprising one or more serial data channels in which it is desirable to provide improved asynchronous serial data channel connections. For example, the described techniques can be adapted in a straightforward manner to other types of serial links including, but not limited to, Infini-Band, IEEE 1394, PCI-Express, Ethernet, and certain DWDM or SONET links.

Figure 1:
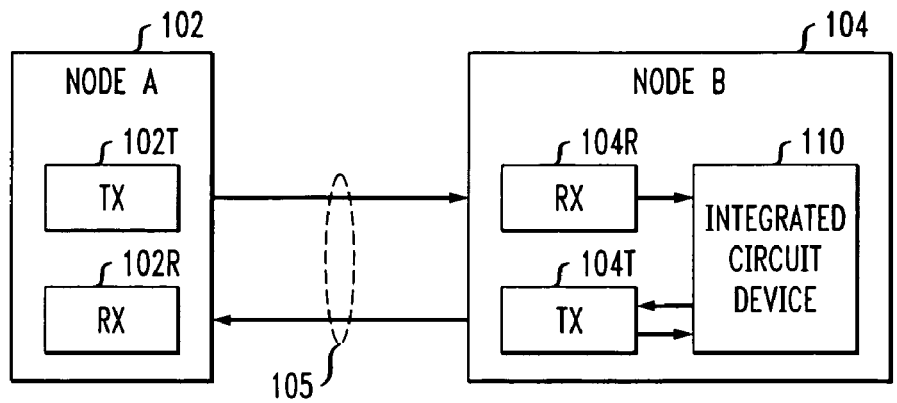
FIG. 1 is a simplified block diagram showing an example of serial link communication between nodes of a communication system in which the present invention is implemented.

Referring initially to FIG. 1, the diagram shows a portion of a communication system 100 in which the present invention is implemented. The system 100 comprises a first node 102, also denoted as Node A, and a second node 104, also denoted as Node B. The two nodes are connected by a bidirectional serial data channel transmission medium 105, also referred to herein as a "link." Node A comprises a transmitter 102T configured for communication with a receiver 104R of Node B, and a receiver 102R configured for communication with a transmitter 104T of Node B. The present invention in an illustrative embodiment is implemented as an integrated circuit device 110 arranged between receiver 104R and transmitter 104T of Node B. Receiver 104R transmits to integrated circuit device 110, and integrated circuit device 110 transmits to, and receives from, transmitter 104T. This communication between receiver 104R, integrated circuit device 110 and transmitter 104T results in an adjustment of a clock of transmitter 104T for synchronization with a clock of receiver 104R. This synchronization process is described in greater detail in FIG. 3. Thus, as shown, the present invention is implemented between transmitter 104T and receiver 104R of Node B, however, it may also be implemented between transmitter 102T and receiver 102R of Node A, connecting a receiver side to a transmitter side of the same serial link. Also, other configurations may be used, such as combining elements 104R, 104T and 110 into a single integrated circuit device.

Node B in FIG. 1 may be configured, by way of example, as a backplane which connects two switch ASICs implementing E_Ports, not explicitly shown in the figure. Such elements may support multiple data rates, such as, for example, data rates of 4, 8, 10 and 16 Gbps. However, the invention is applicable to other types of ports, such as N_Ports, E_Ports and F_Ports on a backplane, or within a fabric, as defined in the above-cited documents of the Fibre Channel standard.

Figure 2:
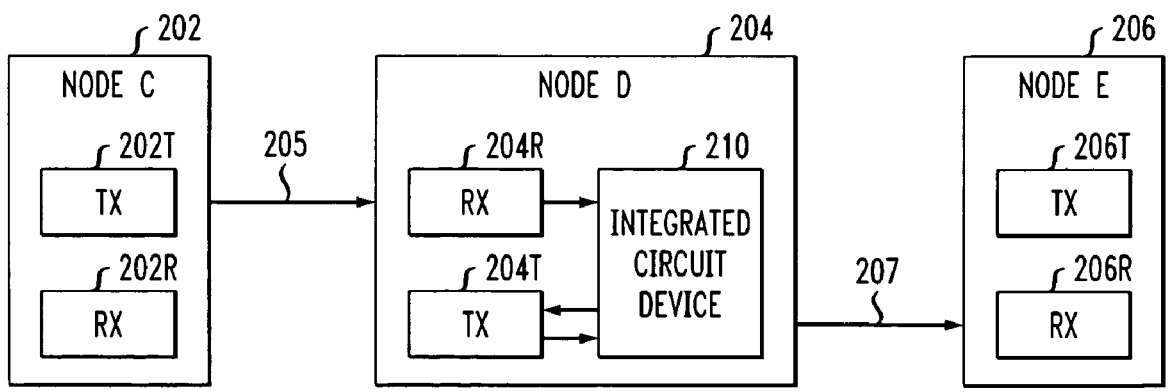
FIG. 2 is a simplified block diagram showing another example of serial link communication between nodes of a communication system in which the present invention is implemented.
Figure 3:
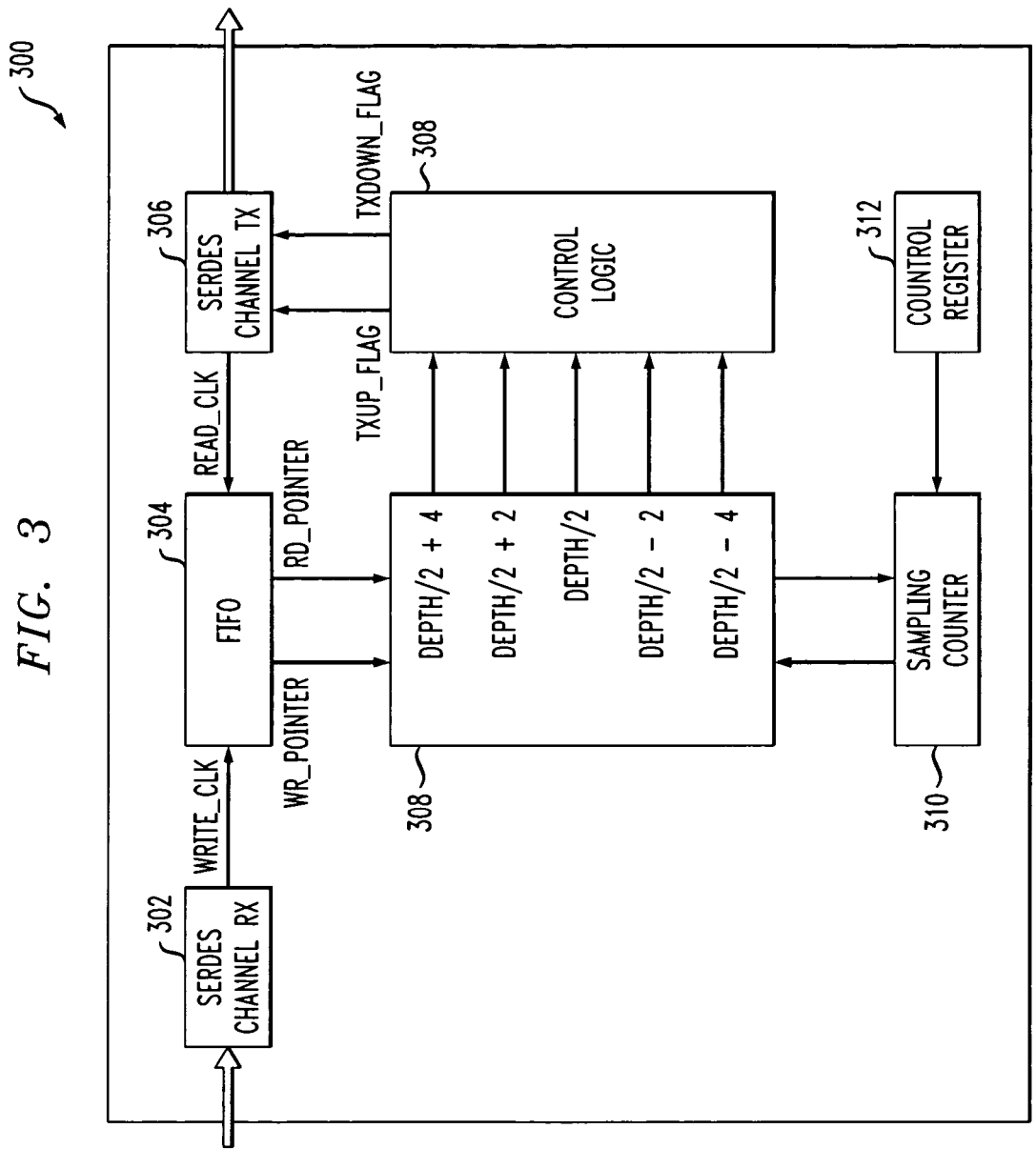
FIG. 3 is a more detailed block diagram illustrating a node of a communication system, according to an embodiment of the present invention.

FIG. 2 shows a portion of another communication system 200 in which the present invention is implemented. The system 200 includes a first node 202, also denoted as Node C, a second node 204, also denoted as Node D, and a third node 206, also denoted as Node E. Node C and Node D are connected by a first serial data channel transmission medium 205, and Node D and Node E are connected by a second serial data channel transmission medium 207. Node C has a receiver 202R and a transmitter 202T. Transmitter 202T is configured for communication with a receiver 204R of Node D, which also has a transmitter 204T. Transmitter 204T is configured for communication with a receiver 206R of Node E, which also has a transmitter 206T. The present invention, in the particular embodiment shown in FIG. 3, is implemented as an integrated circuit device 210 between receiver 204R and transmitter 204T of Node D, connecting two separate serial links. The communication between receiver 204R, integrated circuit device 210 and transmitter 204T is similar to that presented above with regard to FIG. 1. Thus, a clock of transmitter 204T is adjusted for synchronization with a clock of receiver 204R, resulting in a synchronization of serial links 205 and 207. Again, a single integrated circuit device may combine multiple elements, such as elements 204R, 204T and 210.

It is to be appreciated that the particular numbers of nodes shown in FIGS. 1 and 2, and their particular topology and configuration, are presented by way of illustrative example only. Other embodiments of the invention can include different numbers and arrangements of nodes. For example, various topologies based on fabric interconnection of the nodes are possible. The invention is also applicable to topologies such as those described in the above-cited FC-DA document of the Fibre Channel standard, as well as other Fibre Channel topologies.

Referring now to FIG. 3, a diagram illustrates a node of a communication system, according to an embodiment of the present invention. This may be considered a detailed description of Node B, 104, in FIG. 1, or Node D, 204, in FIG. 2. In both FIG. 1 and FIG. 2, an integrated circuit device 110, 210 connects a receiver 104R, 204R and a transmitter 104T, 204T of a node. An illustrative embodiment of integrated circuit device 110, 210 is shown in greater detail in FIG. 3, represented by elements 304, 308, 310 and 312. Elements 302 and 306 may be viewed as representing elements 104R and 104T of FIG. 1, or elements 204R and 204T of FIG. 2.

A node 300 of the communication system uses a memory to connect asynchronous channels of one or more serial links. In a preferred embodiment, the memory is a FIFO buffer 304. However, the asynchronous channels may also be connected using other FIFO implementations, other types of memory, or a type of state machine. Data signals are received at receiver 302, for example, SERDES RX channel, of node 300. The data is written to FIFO buffer 304 in accordance with a receiver clock. The receiver clock has a specific frequency that directly impacts the speed at which the data is written to FIFO buffer 304. A transmitter 306, for example, SERDES TX channel, reads the data in FIFO buffer 304 that was written by receiver 302. This embodiment also preferably utilizes a spread spectrum transmitter clock generator implemented inside transmitter 306. The transmitter clock has a specific frequency that directly impacts the speed at which the data is read from FIFO buffer 304.

A control logic circuit 308 in communication with FIFO buffer 304, is configured to send a control signal to the transmitter to adjust a speed of the transmitter clock, responsive to an operating condition, or fullness measure, of the FIFO buffer 304. Special markers, or pointers, are incorporated into FIFO buffer 304 to determine where, in the continually updating data, receiver 302 is currently writing and transmitter 306 is currently reading. These markers are referred to herein as a write pointer and a read pointer. The distance between the write pointer and the read pointer is monitored by control logic circuit 308, and as the distance reaches certain thresholds, control logic circuit 308 may send specified control signals to transmitter 306 that affect the speed of the transmitter clock.

For example, in one embodiment of the present invention, the thresholds relate to a depth of FIFO buffer 304. A FIFO buffer depth relates to the maximum number of entries or words the buffer is able to store. FIFO buffer 304 also has a defined width that relates to the maximum number of bits per word. In this embodiment, when control logic circuit 308 determines that the distance between the write pointer and the read pointer is approximately equal to Depth/2+2, where "Depth" is the depth of FIFO buffer 304, control logic circuit 308 sends a control message to transmitter 306 to increase the speed of the transmitter clock, through, for example, a TXUP_FLAG as shown in FIG. 3. The speed of the transmitter clock may be increased, for example, by adding a fixed parts per million (PPM) offset to the transmitter clock frequency. The fact that the distance between the write pointer and read pointer has reached this threshold distance indicates that the amount of data written to FIFO buffer 304 is approaching its defined depth. Thus, the speed of the transmitter clock must be increased, so that the speed at which the data is read increases, and the amount of data in FIFO buffer 304 never reaches its defined depth.

At substantially the same time that the control signal is sent from control logic circuit 308 to transmitter 306, a sampling counter 310 is initialized by a control register 312 with a specific count. If the distance between the write pointer and the read pointer remains approximately the same when the count of sampling counter 310 is completed, a second control signal is sent from control logic circuit 308 to transmitter 306, again increasing the speed of the transmitter clock. However, if the distance between the write pointer and the read pointer further increases, equaling approximately Depth/2+4, before the end of the count of sampling counter 310, the second control signal is sent from logic control circuit 308 to transmitter 306, increasing the speed of the transmitter clock, before the count of sampling counter 310 is completed. Accordingly, with the sending of this second control signal, sampling counter 310 is reset to count again. This process may occur repeatedly until the speed of the transmitter clock is increased to a rate that results in a distance between the read pointer and the write pointer that is equal to approximately Depth/2.

A similar process takes place in node 300 when the transmitter clock is operating too quickly. For example, a control signal is sent from control logic circuit 308 to transmitter 306 when the distance between the write pointer and the read pointer is approximately equal to Depth/2−2, through, for example, a TXDOWN_FLAG as shown in FIG. 3. A second control signal may be sent if the distance between the write pointer and the read pointer is approximately equal to Depth/2−4. Sampling counter 310 is initialized upon the sending of a control signal, and acts in substantially the same manner as described above when the distance remains the same through the count of sampling counter 310. In the case where the transmitter clock is operating too quickly, a control message is sent that subtracts a fixed PPM offset from the transmitter clock frequency. Again, this process of decreasing the speed of the transmitter clock may occur repeatedly or in combination with the process of increasing the speed of the transmitter clock until it reaches a rate that results in a distance between the read pointer and the write pointer that is equal to approximately Depth/2.

Thus, it is preferable for FIFO buffer 304 in the illustrative embodiment to have a consistent distance between the write pointer and the read pointer. The receiver clock is always determined by the sending device, and the transmitter serial data rate will automatically follow the rate of the adjusted transmitter clock until it is approximately equal to the receiver data rate. When this occurs FIFO buffer 304 will be half full, or at approximately Depth/2.

In a more specific embodiment, FIFO buffer 304 may have a depth of 10 and a width of 20 bits. In such an embodiment, the threshold values between the read pointer and the write pointer for increasing the speed of the transmitter clock would be 7 and 9, while the threshold values for decreasing the speed of the transmitter clock would be 3 and 1. FIFO buffer 304 would be stable when there is a distance of 5 between the read pointer and the write pointer. During stability, it is possible for the distance to fluctuate by +/−1.

Although certain thresholds are defined in FIG. 3, alternative thresholds may be utilized. These thresholds may include different equations that relate to the depth of FIFO buffer 304 or they may not relate to the depth of FIFO buffer 304. It is also possible for the thresholds of FIFO buffer 304 to be programmable much in the same way that control register 312 is able to program the count of sampling counter 310. Further, different configurations of FIFO buffer 304, control logic circuit 308, sampling counter 310 and control register 312 may also be utilized, especially in situations with programmable thresholds.

The present invention may be implemented in the form of one or more integrated circuits. For example, a given system node in accordance with the invention may be implemented as one or more integrated circuits comprising at least one processor and at least one memory. Numerous other configurations are possible.

In such an integrated circuit implementation, a plurality of identical die are typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

The present invention may also be implemented at least in part in the form of one or more software programs that, within a given node, are stored in memory and run on a processor. Such node processor and memory elements may comprise one or more integrated circuits. A memory storing executable program code of one or more software programs to be run on a processor is an example of what is also commonly referred to by those skilled in the art as a machine-readable or computer-readable storage medium.

Again, it should be emphasized that the embodiments of the invention as described herein are intended to be illustrative only.

For example, the Fibre Channel interface used in the illustrative embodiments may be replaced with another type of standard serial data channel interface, or a non-standard serial data channel interface, as well as combinations of standard and non-standard interfaces. As a more particular example, and as indicated previously herein, the techniques of the present invention can be adapted in a straightforward manner for use over other types of serial links including, but not limited to Infini-Band, IEEE 1394, PCI-Express, Ethernet, and certain DWDM or SONET links. Also, the particular arrangements of system devices and processing elements as shown in the figures may be varied in alternative embodiments. These and numerous other alternative embodiments within the scope of the following claims will be readily apparent to those skilled in the art.

What is claimed is:

1. An integrated circuit device for use in a node of a communication system, the device comprising:
 a memory configured to store data written thereto by a receiver associated with the node in accordance with a receiver clock, wherein the data is read therefrom by a transmitter associated with the node in accordance with a transmitter clock;
 a control logic circuit in communication with the memory, configured to send a first control signal to the transmitter to adjust a speed of the transmitter clock responsive to a first operating condition of the memory; and
 a sampling counter in communication with the control logic circuit and initialized substantially concurrently with the sending of the first control signal;
 wherein the control logic circuit is configured to make a further adjustment to the speed of the transmitter clock by sending a second control signal responsive to the sampling counter reaching a defined count.

2. The integrated circuit device of claim 1, wherein the control logic circuit monitors data written by the receiver and data read by the transmitter through a data write pointer and a data read pointer, respectively.

3. The integrated circuit device of claim 2, wherein the control logic circuit increases the speed of the transmitter clock when a distance between the data write pointer and the data read pointer reaches a first defined threshold, and decreases the speed of the transmitter clock when a distance between the data write pointer and the data read pointer reaches a second defined threshold.

4. The integrated circuit device of claim 3, wherein the speed of the transmitter clock is increased by adding a fixed parts per million (PPM) offset to a frequency of the transmitter clock, and the speed of the transmitter clock is decreased by subtracting a fixed PPM offset from a frequency of the transmitter clock.

5. An integrated circuit device for use in a node of a communication system, the device comprising:
 a memory configured to store data written thereto by a receiver associated with the node in accordance with a receiver clock, wherein the data is read therefrom by a transmitter associated with the node in accordance with a transmitter clock; and
 a control logic circuit in communication with the memory, configured to send a first control signal to the transmitter to adjust a speed of the transmitter clock responsive to an operating condition of the memory;
 wherein the control logic circuit monitors data written by the receiver and data read by the transmitter through a data write pointer and a data read pointer, respectively;
 wherein the control logic circuit increases the speed of the transmitter clock when a distance between the data write pointer and the data read pointer reaches a first defined threshold, and decreases the speed of the transmitter clock when a distance between the data write pointer and the data read pointer reaches a second defined threshold;
 the device further comprising a sampling counter in communication with the control logic circuit configured to have the control logic circuit send a second control signal to adjust the speed of the transmitter clock when the sampling counter reaches a defined count and the distance between the data write pointer and the data read pointer has remained approximately the same.

6. The integrated circuit device of claim 5, further comprising a control register in communication with the sampling counter that initializes the defined count.

7. The integrated circuit device of claim 3, wherein the control logic circuit further increases the speed of the transmitter clock when a distance between the data write pointer and the data read pointer reaches a third threshold that is greater than the first threshold, and further decreases the speed of the transmitter clock when a distance between the data write pointer and the data read pointer reaches a fourth threshold that is less than the second threshold.

8. The integrated circuit device of a claim 1, wherein the receiver is adapted to communicate over a first serial link of the communication system, and the transmitter is adapted to communicate over a second serial link of the communication system.

9. The integrated circuit device of claim 8, wherein the receiver and transmitter are both adapted to communicate over a first serial link of the communication system.

10. The integrated circuit device of claim 1, wherein the memory comprises a first-in first-out (FIFO) buffer.

11. A method, for use in a communication system having at least one node, for controlling a transmitter clock associated with the at least one node, the method comprising the steps of:
 writing data to a memory associated with the at least one node by a receiver associated with the at least one node in accordance with a receiver clock;
 reading data from the memory by a transmitter associated with the at least one node in accordance with a transmitter clock;
 sending a first control message from a control logic circuit associated with the at least one node in communication with the memory to the transmitter to adjust a speed of the transmitter clock responsive to a first operating condition of the memory;
 initializing a sampling counter substantially concurrently with the sending step; and
 making a further adjustment to the speed of the transmitter clock by sending a second control message responsive to the sampling counter reaching a defined count.

12. The method of claim 11, wherein the step of sending a control message comprises the steps of:
 monitoring data at the memory through the control logic circuit;
 determining a distance between a data write pointer and a data read pointer in the memory;
 sending a control message to increase the speed of the transmitter clock when the distance between the data write pointer and the data read pointer reaches a first threshold value; and
 sending a control message to decrease the speed of the transmitter clock when the distance between the data write pointer and the data read pointer reaches a second threshold value.

13. The method of claim 12, wherein, in the steps of sending a control message to increase and decrease the speed of the transmitter clock, the first threshold value and the second threshold value correspond to a memory depth.

14. The method of claim 12, further comprising the step of initializing the sampling counter in communication with the control logic circuit when a control message is sent.

15. The method of claim 14, wherein the step of initializing the sampling counter comprises the step of programming a defined count in the sampling counter through a control register.

16. The method of claim 14, further comprising the step of sending a control message from the control logic circuit to the transmitter to adjust the speed of the transmitter clock when the sampling counter reaches the defined count and the distance between the data write pointer and data read pointer remains approximately the same.

17. The method of claim 12, further comprising the steps of:
   sending a control message to the transmitter to increase the speed of the transmitter clock when the distance reaches a third threshold value larger than the first threshold value; and
   sending a control message to the transmitter to decrease the speed of the transmitter clock when the distance reaches a fourth threshold value smaller than the second threshold value.

18. The method of claim 12, wherein the step of sending a control message to increase the speed of the transmitter clock comprises the step of adding a fixed parts per million (PPM) offset to a frequency of the transmitter clock.

19. The method of claim 12, wherein the step of sending a control message to decrease the speed of the transmitter clock comprises the step of subtracting a fixed PPM offset from a frequency of the transmitter clock.

20. A computer-readable storage medium having embodied therein executable program code of one or more software programs, for use in a communication system having at least one node, the at least one node being operative under control of the one or more software programs to perform the steps of:
   writing data to a memory associated with the at least one node by a receiver associated with the at least one node in accordance with a receiver clock;
   reading data from the memory by a transmitter associated with the at least one node in accordance with a transmitter clock;
   sending a first control message from a control logic circuit associated with the at least one node in communication with the memory to the transmitter to adjust a speed of the transmitter clock, responsive to a first operating condition of the memory;
   initializing a sampling counter substantially concurrently with the sending step; and
   making a further adjustment to the speed of the transmitter clock by sending a second control message responsive to the sampling counter reaching a defined count.

* * * * *